(12) United States Patent
Imamura et al.

(10) Patent No.: US 8,631,733 B2
(45) Date of Patent: Jan. 21, 2014

(54) MITER SAW

(75) Inventors: Ryuichi Imamura, Hitachinaka (JP); Masayuki Tajima, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 379 days.

(21) Appl. No.: 12/941,676

(22) Filed: Nov. 8, 2010

(65) Prior Publication Data

US 2011/0107892 A1 May 12, 2011

(30) Foreign Application Priority Data

Nov. 6, 2009 (JP) ................................. 2009-255564
Nov. 6, 2009 (JP) ................................. 2009-255567

(51) Int. Cl.
*B23D 45/04* (2006.01)

(52) U.S. Cl.
USPC .............................. 83/471.3; 83/490; 83/581

(58) Field of Classification Search
USPC ........................................ 83/471.3, 490, 581
See application file for complete search history.

(56) References Cited

U.S. PATENT DOCUMENTS

| 4,694,721 | A  * | 9/1987 | Brickner, Jr. ................ | 83/471.3 |
| 7,980,325 | B2 * | 7/2011 | Botefuhr et al. ............. | 173/217 |
| 2002/0152867 | A1 * | 10/2002 | Meredith et al. ............. | 83/471.3 |
| 2002/0166240 | A1 * | 11/2002 | Duford et al. ................ | 30/277.4 |
| 2003/0088986 | A1 * | 5/2003 | Ushiwata et al. .............. | 30/376 |
| 2006/0101967 | A1 * | 5/2006 | Garcia et al. ................. | 83/473 |
| 2009/0260498 | A1 * | 10/2009 | Imamura et al. .............. | 83/663 |

FOREIGN PATENT DOCUMENTS

JP 2006-327088 12/2006

* cited by examiner

*Primary Examiner* — Stephen Choi
(74) *Attorney, Agent, or Firm* — McDermott Will & Emery LLP

(57) ABSTRACT

A miter saw is provided with a base unit on which target material is placed, a table unit rotatably provided on the base unit, a swing unit for swinging up and down above the table unit, and a cutting unit provided on the swing unit and having a flat motor provided with a rotor having an output shaft and a coil disc provided with a plurality of coil pieces arranged in the circumferential direction about the output shaft when seen in the direction of the axis of the output shaft and a stator having a magnet arranged such that magnetic flux passes through the coil disc in the direction of the axis of the output shaft, and a rotating blade rotation shaft on which a rotating blade can be mounted and positioned substantially parallel to the direction of the axis of the output shaft of the flat motor, and a power transfer unit that transfers the power of the flat motor to the rotating blade.

13 Claims, 16 Drawing Sheets

MITER SAW

CROSS-REFERENCE TO RELATED APPLICATION

This application claims the benefit of Japanese Patent Applications No. 2009-255564, filed Nov. 6, 2009 and No. 2009-255567, filed Nov. 6, 2009, the entire disclosure of which is incorporated by reference herein

FIELD

This application relates generally to a miter saw such as a tabletop circular saw, and more particularly, to a miter saw provided with a flat motor.

BACKGROUND

As shown in the disclosure of Unexamined Japanese Patent Application KOKAI Publication No. 2006-327088, a miter saw is known which has a turntable rotatably provided on a base unit, and a cutting unit having a circular saw blade tiltably provided on the turntable. With this kind of miter saw, angled cutting of material is possible by rotating the turntable with respect to the base unit. In addition, inclined cutting of material is possible by inclining the cutting unit with respect to the turntable. Furthermore, the circular saw blade is driven by a motor positioned such that the output shaft is roughly parallel to the axis of revolution of the circular saw blade.

However, with a miter saw using the above-described motor, the dimensions of the motor becomes long in the axial direction of the output shaft because the rotor and stator are long in the axial direction of the motor output shaft. Furthermore, because inclined cutting is accomplished in either of the axial directions of the rotating shaft of the circular saw blade, a power transfer mechanism is provided between the circular saw blade and the motor of the cutting unit and the position of the motor is separated from the circular saw blade and the turntable so that the motor does not make contact with the turntable or the like when inclined. However, because the above-described motor and power transfer mechanism are present, the dimensions of the cutting unit in the axial direction of the motor output shaft become larger, creating the problem that the field of vision of the worker could be obstructed when working.

SUMMARY

In consideration of the foregoing, it is an object of the present invention to provide a miter saw with which it is possible to secure a broad field of vision for the worker by reducing the dimensions of the motor in the axial direction of the output shaft.

In order to achieve the above object, a miter saw according to a first aspect of the present invention comprises a base unit on top of which target material is placed; a table unit provided on the base unit so as to be capable of rotating about a first axis; a swing unit which is provided on the table unit so as to be capable of rotating about a second axis substantially orthogonal to the first axis, and which swings up and down above the table unit; and a cutting unit provided on the swing unit and having a flat motor provided with a stator and a rotor, the rotor having an output shaft, with one of the rotor and the stator having a coil disc provided with a plurality of coil pieces arranged in the circumferential direction about the output shaft when seen in the axial direction of the output shaft and the other of the rotor and the stator having a magnetic flux generation unit for generating magnetic flux that passes through the coil disc in the axial direction of the output shaft, a rotating blade rotation shaft on which a rotating blade can be mounted and an axial direction of the rotating blade rotation shaft is arranged so as to be substantially parallel to the axial direction of the output shaft of the flat motor and the axial direction of the second shaft, and a power transfer unit for transferring the power of the flat motor to the rotating blade rotation shaft.

In addition, preferably a tilt unit is provided between the table unit and the swing unit, this tilt unit being attached to the table unit so as to be capable of rotating about a third axis substantially orthogonal to the first axis and the second axis and supporting the swing unit to enable rotation about the second axis.

In addition, a slide support unit may be provided between the tilt unit and the swing unit, this slide unit supporting the swing unit on the tilt unit to enable movement substantially parallel to the axial direction of the third shaft.

Furthermore, the flat motor may comprise the rotor having the coil disc; and a housing as the stator provided so as to rotatably support the output shaft and cause the flux generating unit to face the disc surface of the coil disc; wherein the flux generating means is provided with magnets.

In addition, the power transfer unit preferably comprises a first gear provided on the output shaft of the flat motor, a rotating blade gear anchored to the rotating blade rotation shaft, and an intermediate gear provided between the first gear and the rotating blade gear and anchored to an intermediate shaft rotatably supported on the cutting unit; and the flat motor and the intermediate gear are positioned such that in the state in which the swing unit is fully swung the in the direction approaching the cutting unit on the table, the outer edge of the flat motor and the outer edge of the intermediate gear are farther from the table unit in the axial direction of the first shaft than the rotating blade rotation shaft, when seen in the axial direction of the rotating blade rotation shaft.

Furthermore, the intermediate shaft may have a pair of substantially parallel flat surfaces extending in the axial direction of the intermediate shaft; and the cutting unit may have an interlocking unit that can interlock with the pair of flat surfaces, and have a lock member provided so as to be able to move back and forth between a lock position where the interlocking unit interlocks with the flat surfaces, locking rotation of the intermediate shaft, and a lock release position where the interlocking is released and the lock is released.

In addition, the lock member may be provided to as to be able to move back and forth in a direction substantially orthogonal to the axial direction of the intermediate shaft.

The miter saw according to a second aspect of the present invention comprises: a base unit on top of which target material is placed; a swing unit which is provided on the base unit so as to be capable of rotating up and down about a swing shaft above the table unit; and a cutting unit provided on the swing unit and having a flat motor provided with a stator and a rotor, the rotor having an output shaft, with one of the rotor and the stator having a coil disc provided with a plurality of coil pieces arranged in the circumferential direction about the output shaft when seen in the axial direction of the output shaft and the other of the rotor and the stator having a magnetic flux generation unit for generating magnetic flux that passes through the coil disc in the axial direction of the output shaft, a rotating blade rotation shaft on which a rotating blade can be mounted and an axial direction of the rotating blade rotation shaft is arranged so as to be substantially parallel to the axial direction of the output shaft of the flat motor and the axial direction of the swing shaft, and a power transfer unit for transferring the power of the flat motor to the rotating blade rotation shaft.

In addition, the base unit may have a tilt unit that supports the swing unit to enable rotation about a tilt shaft substantially orthogonal to the swing shaft.

Furthermore, the base unit may have a table unit which is capable of rotating about a table rotation shaft substantially orthogonal to the swing shaft and the tilt shaft, and the tilt unit may be provided on this table unit.

In addition, a slide support unit may be provided between the tilt unit and the swing unit, this slide unit supporting the swing unit on the tilt unit to enable movement substantially parallel to the axial direction of the tilt shaft.

Furthermore, the flat motor may comprise the rotor having the coil disc and a housing as the stator provided so as to rotatably support the output shaft and cause the flux generating unit to face the disc surface of the coil disc, wherein the flux generating means is provided with magnets.

In addition, the power transfer unit may comprise a first gear provided on the output shaft of the flat motor, a rotating blade gear anchored to the rotating blade rotation shaft, and an intermediate gear provided between the first gear and the rotating blade gear and anchored to an intermediate shaft rotatably supported on the cutting unit; and the flat motor and the intermediate gear may be positioned such that in the state in which the swing unit is fully swung the in the direction approaching the cutting unit on the table, the outer edge of the flat motor and the outer edge of the intermediate gear are farther from the table unit in the axial direction of the table rotation shaft than the rotating blade rotation shaft, when seen in the axial direction of the rotating blade rotation shaft.

Furthermore, the intermediate shaft may have a pair of substantially parallel flat surfaces extending in the axial direction of the intermediate shaft, and the cutting unit may have an interlocking unit that can interlock with the pair of flat surfaces, and have a lock member provided so as to be able to move back and forth between a lock position where the interlocking unit interlocks with the flat surfaces, locking rotation of the intermediate shaft, and a lock release position where the interlocking is released and the lock is released.

In addition, the lock member may be provided to as to be able to move back and forth in a direction substantially orthogonal to the axial direction of the intermediate shaft.

With the present invention, by using a flat motor it is possible to reduce the dimensions of the motor of the cutting unit in the axial direction of the output shaft, making it possible to secure a broad field of vision for the worker.

BRIEF DESCRIPTION OF THE DRAWINGS

A more complete understanding of this application can be obtained when the following detailed description is considered in conjunction with the following drawings, in which.

DETAILED DESCRIPTION

Figure 1:
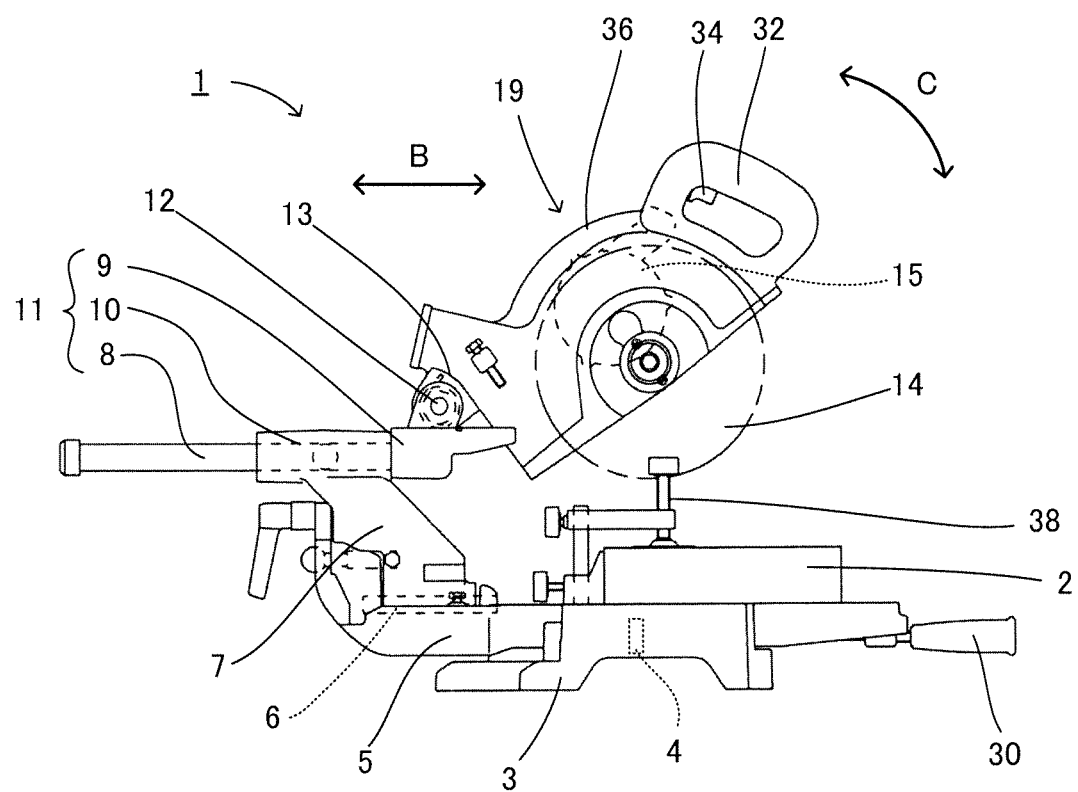
FIG. 1 is a side view of a tabletop circular saw according to an embodiment of the present invention.
Figure 2:
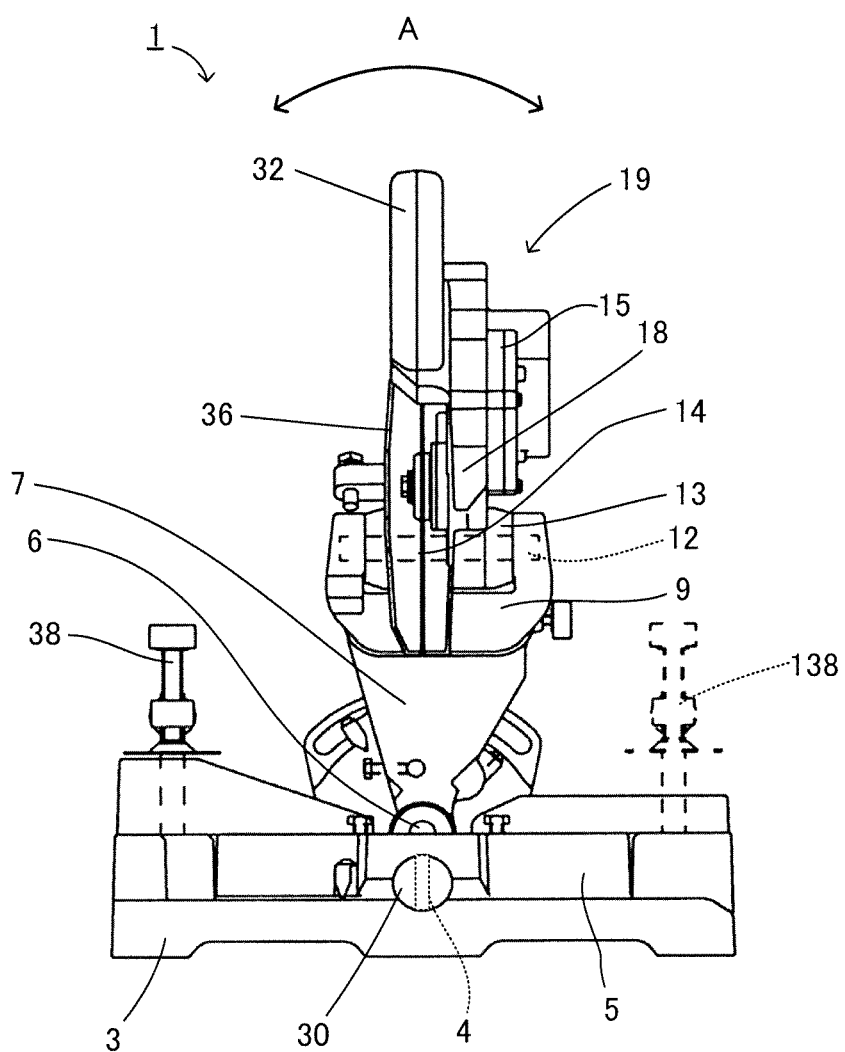
FIG. 2 is a frontal view of the tabletop circular saw of FIG. 1.

The preferred embodiment of the present invention is described below with reference to the attached drawings. As shown in FIGS. 1 and 2, a miter saw 1 is provided with a base unit 3 installed on the floor for holding a target material 2 such as wood or the like on the top surface. The base unit 3 is provided with a table rotation shaft (first shaft) 4 extending in the up-down direction in FIG. 1. Furthermore, a turntable (table unit) 5 is attached to the base unit 3 so as to be capable of rotating about the table rotation shaft 4. In addition, the base unit 3 is provided with clamps 38 and 138 for anchoring the target material 2. Near the right edge of the turntable 5 in FIG. 1, a handle 30 is provided which a worker can grasp when causing the turntable 5 to rotate. In addition, near the left edge of the turntable in FIG. 1, a tilt shaft (third shaft) 6 extending in the left-right direction in FIG. 1 is provided at a substantially right angle to the table rotation shaft 4. Furthermore, a tilt unit 7 is attached to the turntable 5 so as to be capable of tilting to the left and right as indicated by arrow A in FIG. 2 about the tilt shaft 6 and so as to extend upward from the tilt shaft 6 in FIGS. 1 and 2 (in the direction toward the turntable 5 from the base unit 3 in the axial direction of the first shaft). Near the end of the tilt unit 7 away from the tilt shaft 6, a slide shaft 8 is provided substantially parallel to the tilt shaft 6 and extending in the left-right direction in FIG. 1. Furthermore, a support unit 10 for supporting a slide unit 9 anchored to the slide shaft 8 is attached to the tilt unit 7 so as to be capable of sliding to the left and right as indicated by arrow B in FIG. 1. The slide shaft 8, slide unit 9 and support unit 10 constitute a slide support unit 11. A swing shaft (second shaft) 12 extending in the left-right direction in FIG. 2 is provided substantially perpendicular to the slide shaft 8 on the slide unit 9. Furthermore, a swing unit 13 is provided so as to be capable of swinging about the swing shaft 12 with respect to the slide unit 9, as indicated by arrow C in FIG. 1. The swing unit 13 is provided with an abutment that abuts a position at a predetermined angle with respect to the slide unit 9, and this abutment prescribes the relative angular region in which swinging of the swing unit 13 is possible. Furthermore, on this swing unit 13 a cutting unit 19 is attached, having a circular saw blade 14 (rotating blade) for cutting the target material 2, a flat motor 15 for driving the circular saw blade 14, and a power transfer unit 18 for transferring the power of the flat motor 15 to the circular saw blade 14. As shown in FIG. 2, the circular saw blade 14 is attached such that the rotating surface is substantially orthogonal to the swing shaft 12. A handle 32 for grasping when swinging the cutting unit 19 toward the turntable 5 is provided on the cutting unit 19. On the handle 32, a trigger switch 34 is provided for controlling rotation and stopping of the flat motor 15. In addition, roughly half of the outer perimeter of the circular saw blade 14 is covered by a saw blade cover 36 anchored to the cutting unit 19. The clamps 38 and 138 are provided on the base unit 3 roughly symmetrically with the table rotation shaft 4 of the turntable interposed in between, or roughly symmetrically with the circular saw blade 14 interposed in between in a state in which the tilt unit 7 is not tilted (a state in which the tilt unit 7 is roughly parallel to the table rotation shaft 4), as shown in FIG. 2.

Figure 3:
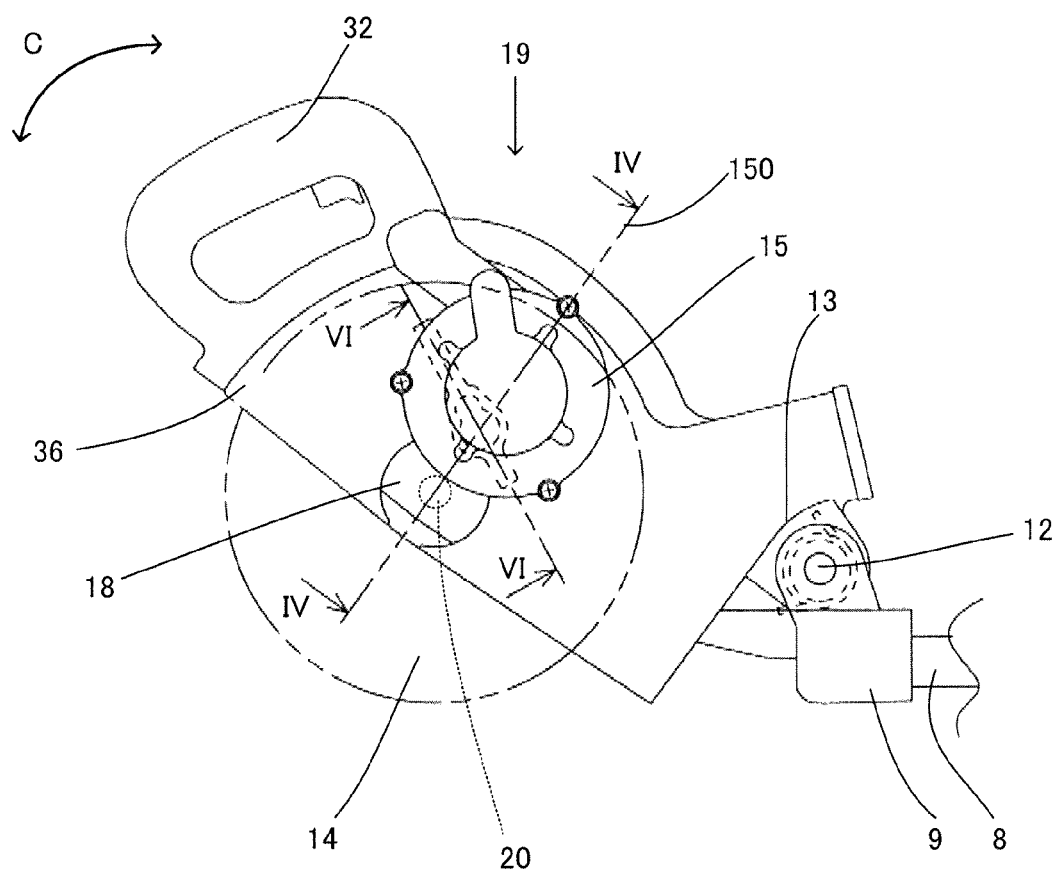
FIG. 3 is an enlarged side view of the cutting unit of the tabletop circular of FIG. 1 viewed from the opposite as in FIG. 1.

As shown in FIG. 3, the flat motor 15 is positioned on the cutting unit 19 offset with respect to the circular saw rotation axis (rotating blade rotation axis) of the circular saw blade 14. Furthermore, a power transfer unit 18 is interposed between the flat motor 15 and the circular saw blade 14.

Figure 4:
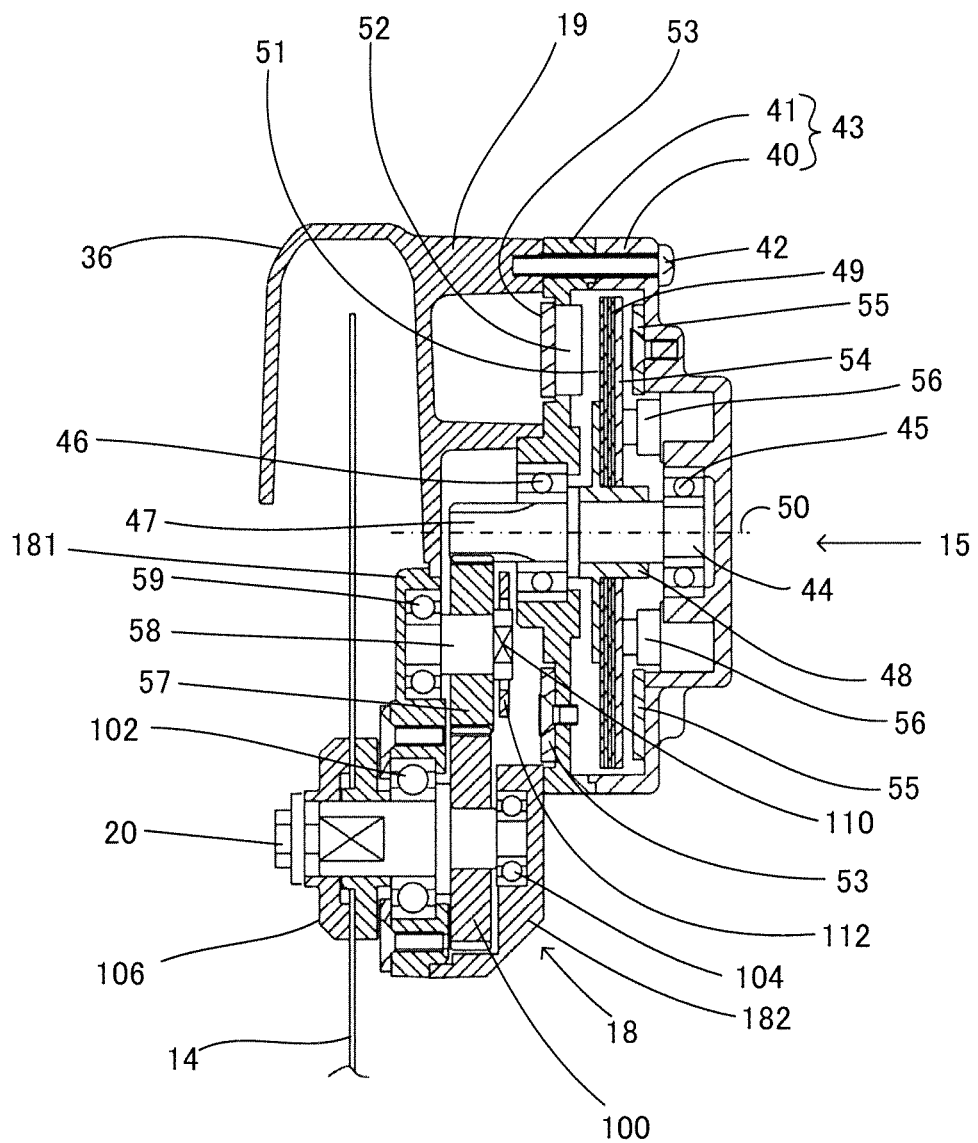
FIG. 4 is a cross-sectional view taken along line W-IV in FIG. 3.

As shown in FIG. 4, the flat motor 15 attached to the cutting unit 19 has a housing 43 in which a first housing unit 40 and a second housing unit 41 are connected by a screw 42. Inside the housing 43, an output shaft 44 protruding from the second housing 41 is rotatably supported by a first bearing 45 attached to the first housing unit 40 and a second bearing 46 attached to the second housing unit 41. The edge of the output shaft 44 protruding from the second housing unit 41 is cut to form a pinion gear (first gear) 47 in a flat gear shape. A roughly disc-shaped coil disc 49 formed by layering a plurality of discs having a plurality of coil patterns formed on the surface is anchored to the output shaft 44 via a flange 48 between the first bearing 45 and the second bearing 46. Furthermore, the output shaft 44, the flange 48 and the coil disc 49 constitute a rotor of the flat motor 15 rotating as one.

Inside the housing 43, a ring-shaped iron yoke 53 and a plurality of magnets 52 such as permanent magnets, electromagnets or the like positioned separated in the circumferential direction with respect to the disc surface 51 of the coil disc 49 in the leftward direction in FIG. 4 is attached to the second housing unit 41 so that the magnetic flux passes through the coils of the coil disc 49 in the direction of the axis 50 of the output shaft 44. In addition, a ring-shaped iron yoke 55 is attached to the first housing unit 40 of the housing 43 in a position facing the disc surface 54 of the coil disc 49 to the right in FIG. 4, the coil disc 49 being interposed in between, and facing the iron yoke 53, when seen in the direction of the axis 50 of the output shaft 44. The magnet 52 and the iron yokes 53 and 55 constitute a magnetic flux generation unit. However, this composition of the magnetic flux generation unit is intended to be illustrative and not limiting, as long as the magnetic flux passes through the coils of the coil disc 49 in the direction of the axis 50 of the output shaft 44, and for example may be composed of a plurality of permanent magnets, electromagnets or coils alone. Furthermore, a brush 56 is attached to the first housing unit 40 of the housing 42 contacting the disc surface 54 to the right of the coil disc 49 in order to supply electricity to the coils of the coil disc 49. The housing 43 in which this magnet 52 and the iron yokes 53 and 55 are provided constitute the stator of the flat motor 15. Furthermore, the flat motor 15 is composed as a flat direct current commutator motor with the output shaft 44 and a flange 48 and coil disc 49 anchored to the output shaft 44 as the rotor, and the magnet 52, the iron yokes 53 and 55 and the brush 56 as the stator.

As shown in FIG. 4, an intermediate gear 57 engages with the pinion gear 47 of the output shaft 44 of the flat motor 15. The intermediate gear 57 is anchored to an intermediate shaft 58, and the intermediate shaft 58 is rotatably supported by a third bearing 59 attached at one end to a first case 181 of the power transfer unit 18. In addition, the intermediate gear 57 engages with a final gear (rotating blade gear) 100 anchored to a circular saw rotation shaft 20 to which the circular saw blade 14 is attached. The saw blade rotation shaft 20 is rotatably supported by a fourth bearing 102 attached to the first case 181 of the power transfer unit 18 and a fifth bearing 104 attached to a second case 182 of the power transfer unit 18. In addition, the circular saw blade 14 is removably attached to the saw blade rotation shaft 20 by a mounting mechanism 106 and rotates integrally with the saw blade rotation shaft 20. As shown in FIG. 4, the output shaft 44 of the flat motor 15, the intermediate shaft 58 of the intermediate gear 57 and the saw blade rotation shaft 20 of the final gear 100 are positioned so as to be substantially parallel with each other. In addition, the output shaft 44, the intermediate shaft 58 and the saw blade rotation shaft 20 are each positioned substantially parallel to the swing shaft 12. Furthermore, it is preferable for the flat motor 15 and the intermediate gear 57 to be positioned so that the outer edge of the housing 43 of the flat motor 15 and the outer edge of the intermediate gear 57 are upward from the saw blade rotation shaft 20 (the direction separating from the turntable 5) when the swing unit 13 is in a state fully swung toward the direction approaching the cutting unit 19 of the turntable 5 and abutting the abutment. In addition, the output shaft 44, the intermediate shaft 58 and the saw blade rotation shaft 20 may be positioned substantially on an axial line 150, as shown in FIG. 3.

Figure 5:
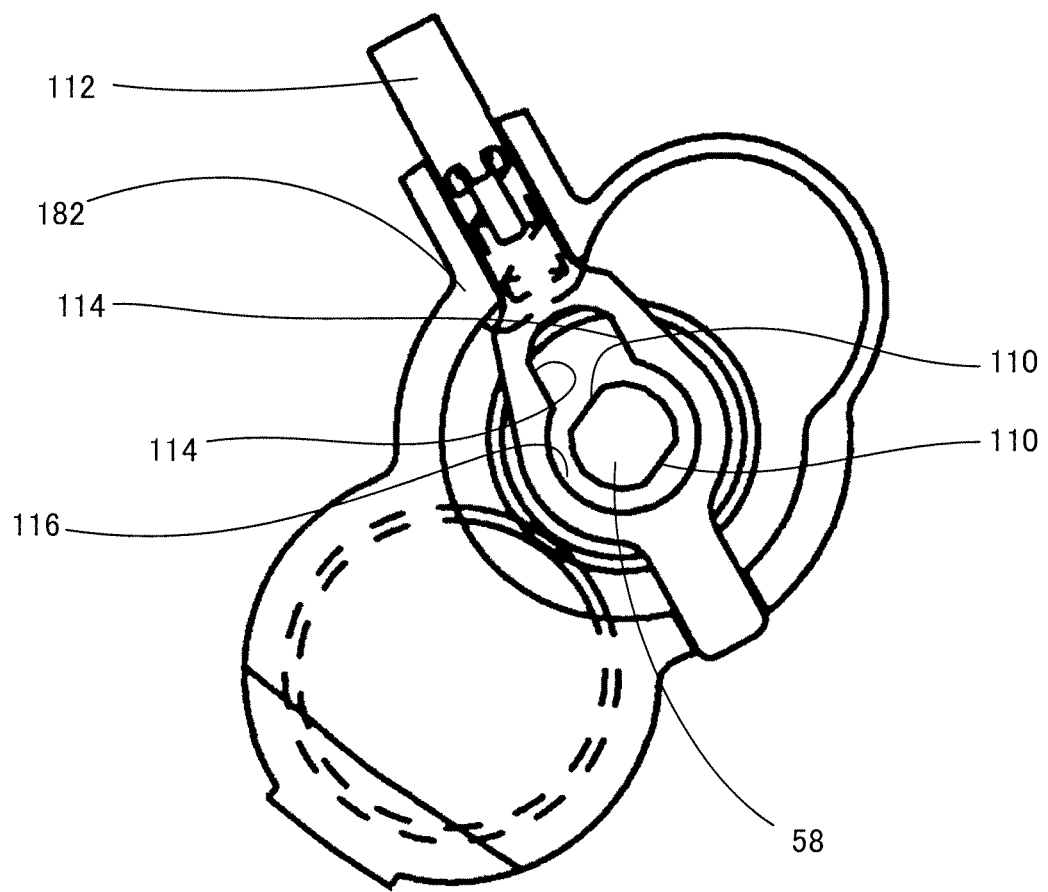
FIG. 5 is an enlargement of the main components showing the attachment area of the intermediate shaft and the lock member.
Figure 6:
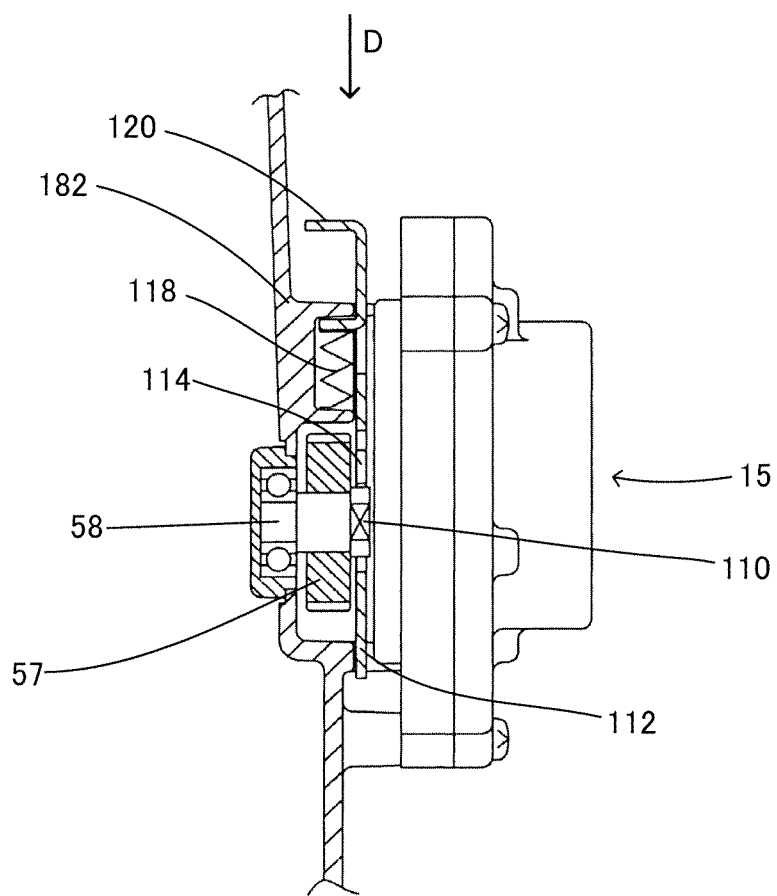
FIG. 6 is a cross-sectional view taken along line VI-VI in FIG. 3.
Figure 7:
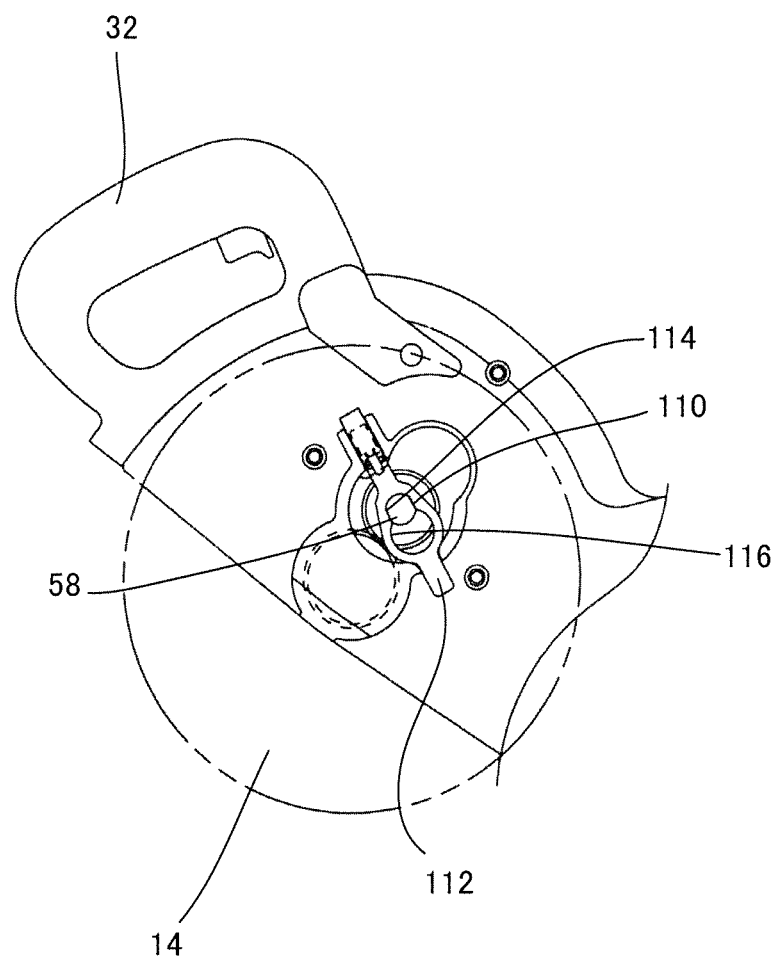
FIG. 7 is an enlargement of the main components showing the attachment area of the intermediate shaft and the lock member in a state with the lock member moved.

Furthermore, a pair of roughly parallel flat surfaces 110 and 110 extending in the axial direction of the intermediate shaft 58 are formed at the end of the intermediate shaft 58 which is the opposite side of the end supported by the third bearing 59. Furthermore, a plate-shaped lock member 112 that can lock rotation of the intermediate shaft 58 by interlocking with the pair of flat surfaces 110 and 110 of the intermediate shaft 58 is provided in the first case 181 so as to be capable of moving back and forth in a direction substantially orthogonal to the axial direction of the intermediate shaft 58. As shown in FIG. 5, the lock member 112 has a pair of interlocking units 114 and 114 capable of interlocking with the pair of flat surfaces 110 and 110 provided substantially parallel and separated by a distance much larger than the distance of the pair of flat surfaces 110 and 110 of the intermediate shaft 58, and an arc-shaped large-diameter unit 116 having an inner diameter larger than the maximum width of the intermediate shaft 58 on which the flat surfaces 110 are formed. Furthermore, as shown in FIG. 6, the lock member 112 is attached to the second case 182 so as to be energized by a spring 118 in a direction in which the intermediate shaft 58 is positioned inside the large-diameter unit 116. When a bent unit 120 at the end is pressed in the direction of arrow D, the interlocking units 114 move in a direction toward the intermediate shaft 58. Furthermore, as shown in FIG. 7, when the interlocking units 114 and the flat surfaces 110 are positioned substantially parallel, the interlocking unit 114 moves to a position interlocking the flat surfaces 110, and the lock member 112 locks rotation of the intermediate shaft 58.

Figure 8:
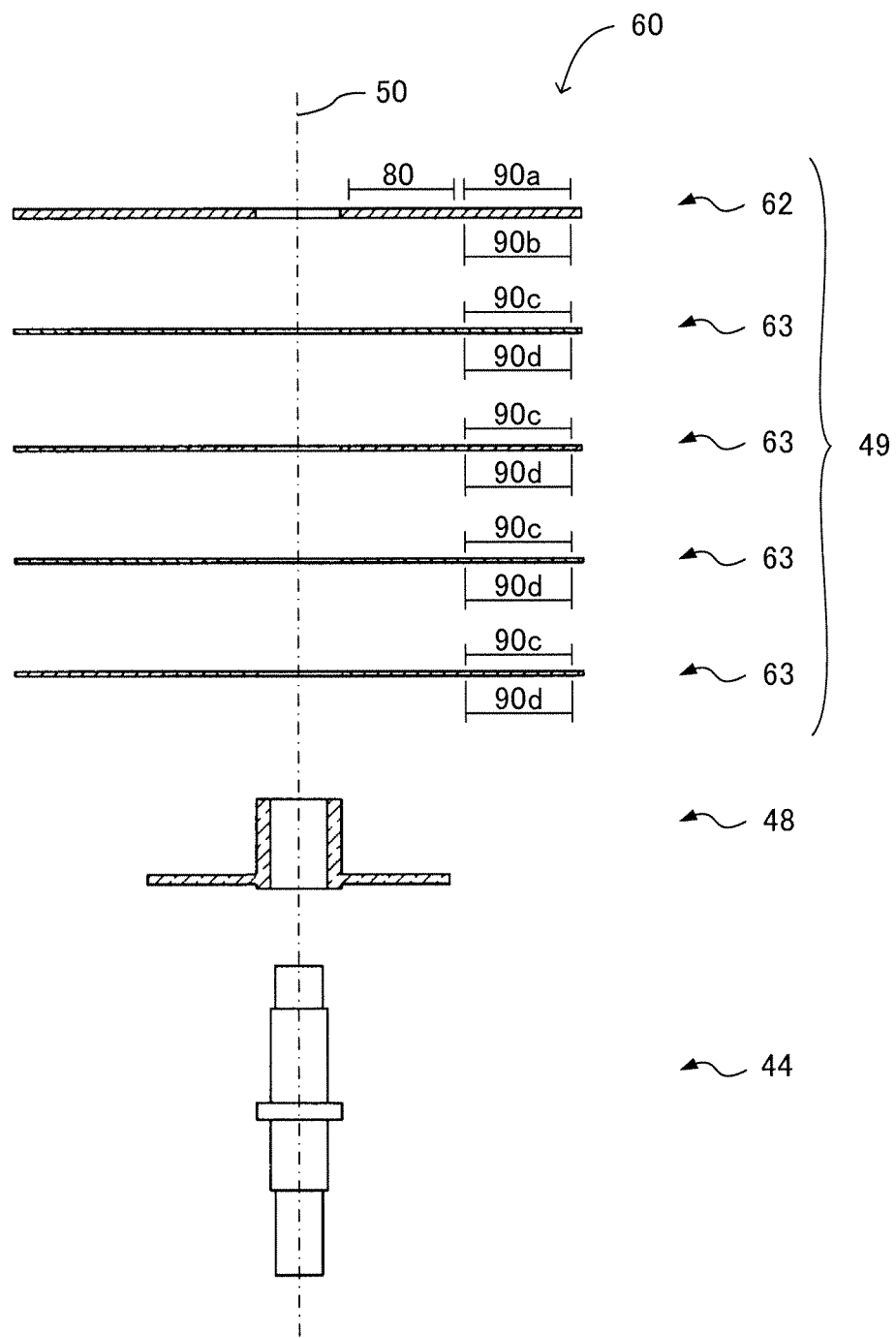
FIG. 8 is an exploded cross-sectional view of the rotor of the tabletop circular saw of FIG. 1.

As shown in FIG. 8, the rotor 60 of the flat motor 15 is composed of the output shaft 44, the flange 56, and the coil disc 49 in which the coil commutator disc 62 and four coil disc units 63 are layered in order from the top in FIG. 8. The coil commutator disc 62 and the coil disc units 63 are printed circuit boards composed of insulating substrates and semiconductor patterns. A commutator region 80 in which the conductive pattern of the commutator is formed, and a coil region 90a in which the conductor pattern of the coil is formed, are provided on the top surface of the coil commutator disc 62. The commutator region 80 and the coil region 90a are each provided in a ring shape centered about the axis 50 and the coil region 90a is positioned on the outer circumference side of the commutator region 80, when seen in the direction of the axis 50 of the output shaft 44. In addition, a coil region 90b in which a conductive pattern for a coil is formed is provided on the bottom surface of the coil commutator disc 62. The coil region 90b is provided in a toric shape centered on the axis 50 and is positioned so as to overlap the coil region 90a, when seen in the direction of the axis 50.

Figure 9:
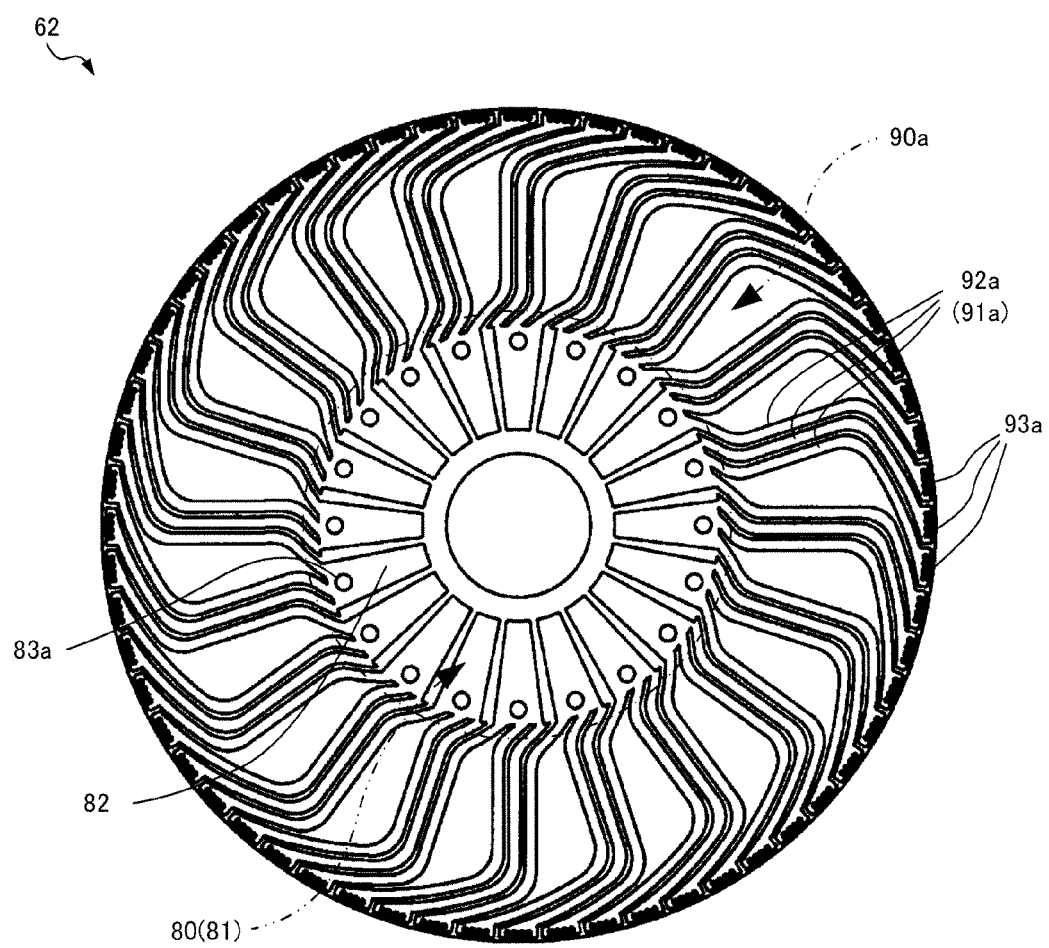
FIG. 9 is a top view of the coil commutator disc of the rotor of FIG. 8.

As shown FIG. 9, a commutator 81 that contacts the brush 56 is formed by a conductive pattern on the commutator region 80 on the top surface of the coil commutator disc 62. The commutator 81 is composed of a plurality of commutator pieces 82 formed in a radial shape with the axis 50 as the center. A through hole 83a that passes through the coil commutator disc 62 is formed on the outside edge of each commutator piece 82.

In addition, a plurality of coil pieces 92a formed by a conductive pattern in a radial shape with the axis 50 as the center are formed in the coil region 90a on the top surface of the coil commutator disc 62. The inside edge of each coil piece 92a is formed directly connected to the corresponding commutator piece 82. In addition, the outside edge of each coil piece 92a is formed bent in a prescribe direction about the axis 50. A plurality of through holes 93a passing through the coil commutator disc 62 are formed in the outside edge of each coil piece 92a.

Figure 10:
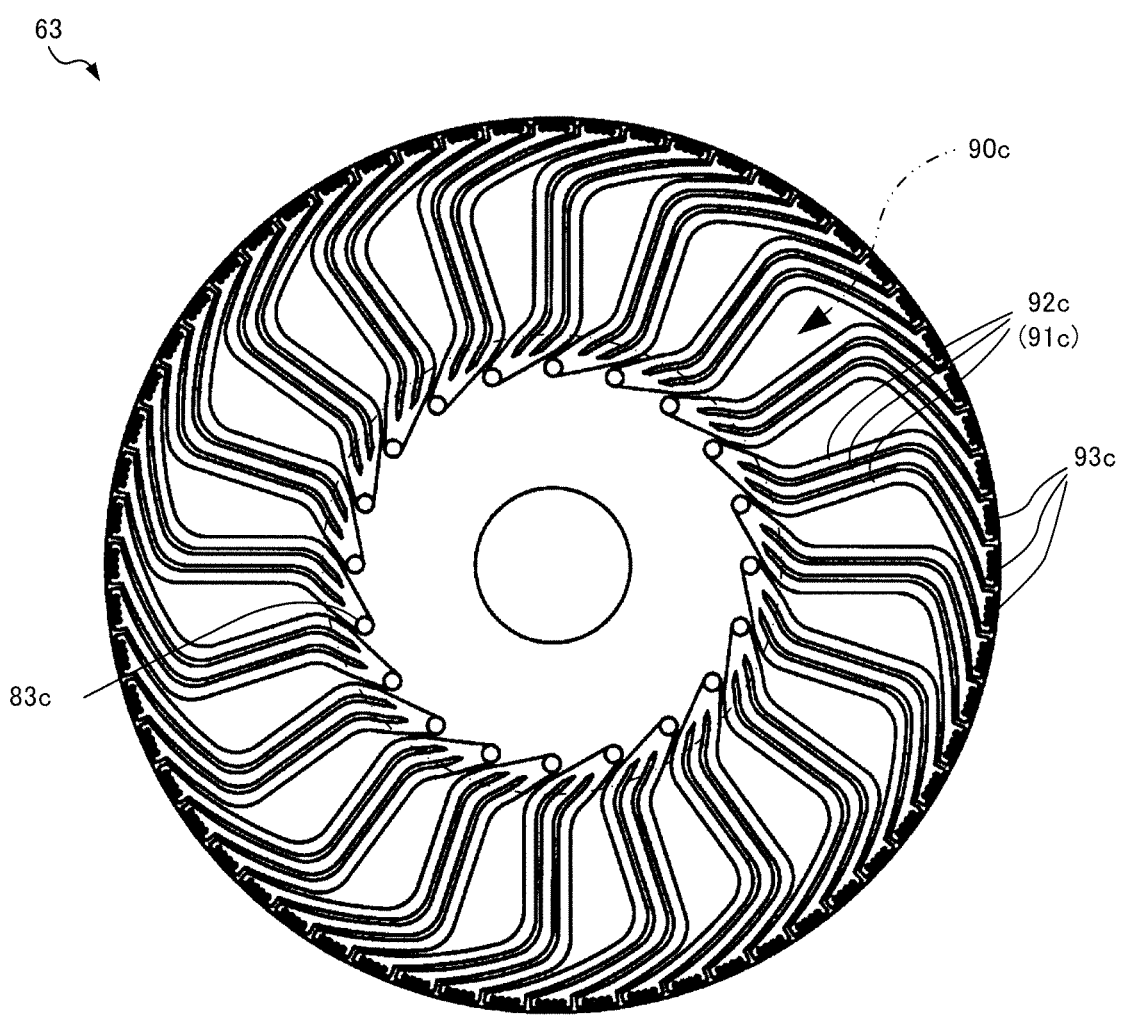
FIG. 10 is a top view of the coil disc part of the rotor of FIG. 8.

A plurality of coil pieces unrepresented in the drawing and formed in a radial shape with the axis 50 as the center are formed in the coil region 90b on the bottom surface of the coil commutator disc 62 by a conductive pattern substantially similar to the coil region 90a shown in FIG. 10. The outside edge of each of these unrepresented coil pieces is connected to the corresponding coil piece 91a of the coil region 90a via solder filling the through hole 93a. In addition, the inside edge of each of these unrepresented coil pieces is connected to the corresponding commutator piece 82 of the commutation region 80 via solder filling the through hole 83a. Through this, the plurality of coil pieces 92a of the coil region 90a and the unrepresented plurality of coil pieces of the coil region 90b constitute a plurality of coils 91a formed in a roughly U-shape in the direction of the axis 50. The plurality of coils 91a is arranged in the circumferential direction centered about the axis 50. In addition, the ends of each coil 91a are connected to the corresponding commutator piece 82 of the commutator region 80.

As shown in FIG. 8, coil regions 90c and 90d in which coil conductive patterns are formed are provided on the top surface and the bottom surface of the coil disc unit 63, respectively. The coil regions 90c and 90d are each provided in a ring shape centered about the axis 50, and are positioned so as to overlap the coil regions 90a and 90b of the coil commutator disc 62, when seen in the direction of the axis 50.

Conductive patterns substantially similar to the coil regions 90a and 90b of the coil commutator disc 62 are formed in the coil regions 90c and 90d of the coil disc unit 63. A plurality of coil pieces 92c formed in a radial shape centered about the axis 50 are formed in the coil region 90c on the top surface of the coil disc unit 63, as shown in FIG. 10. An unrepresented plurality of coil pieces is formed in the coil region 90d on the bottom surface of the coil disc unit 63 through a conductive pattern substantially similar to the coil region 90c. The plurality of coil pieces 92c of the coil region 90c and the unrepresented plurality of coil pieces in the plurality of coil pieces 90d are connected to each other via solder filling the through holes 83c and 93c passing through the coil disc 62, and constitute the plurality of coils 91c formed in a roughly U-shape when seen in the direction of the axis 50. The plurality of coils 91c is arranged in a circumferential direction about the axis 50. In addition, the end of each coil 91c is connected to the corresponding commutator piece 82 of the commutator region 80 via solder filling the through holes 83a of the coil commutator disc 62.

The conductive patterns of the coil region 90a and the commutator region 80 of the coil commutator disc 62 are formed on the same printed circuits. In addition, the conductive patterns of the coil region 90a and the commutator region 80 of the coil commutator disc 62 are formed thicker than the coil region 90b and the coil regions 90c and 90d of the coil disc unit 63 in order to prevent damage caused by friction with the brush 56.

Between the above-described coil commutator disc 62 and the coil disc unit 63, and between the plurality of coil disc units 63, the coils 91a and 91c overlap in the direction of the axis 50, or the coils 91a and 91c are arranged having a prescribed angle about the axis 50 via an unrepresented insulating layer, for example.

With the tabletop circular saw 1 composed in this manner, when the trigger switch 34 on the handle 32 is turned on, a prescribed voltage is applied on the brush 56. The voltage applied on the brush 56 is applied on the coils 91a and 91c formed in the coil disc 49 via the commutator 81. An electric current flows in the coils 91a and 91c on which the voltage is applied d in a roughly radial direction of the coil disc 49 orthogonal to the direction of the axis 50 of the output shaft 44. The direction in which the electric current flows is controlled by the commutator 81. On the other hand, the magnetic flux generated by the magnet 52 passes the coil disc 49 orthogonal to the direction of current flow in the direction of the axis 50 of the output shaft 6. Consequently, in the coil disc 49 a torque is generated in a circumferential direction of the coil disc 49 centered about the axis 50, so the output shaft 44 rotates along with the coil disc 49. Furthermore, the rotation of the output shaft 44 is conveyed to the intermediate gear 57 in the power transfer unit 18 from the pinion gear 47 of the output shaft 44, and is conveyed to the circular saw blade 14 via the final gear 100, and the circular saw blade 14 rotates.

Figure 11:
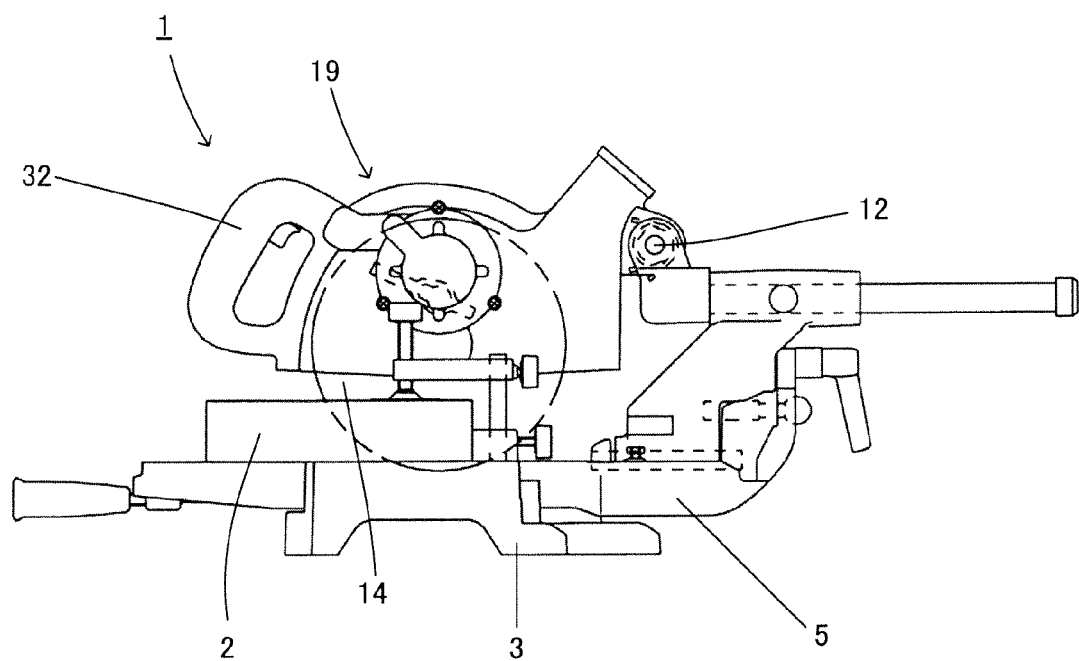
FIG. 11 is a side view showing the top of the tabletop circular saw of FIG. 1 with the cutting unit in its lowest setting.
Figure 12:
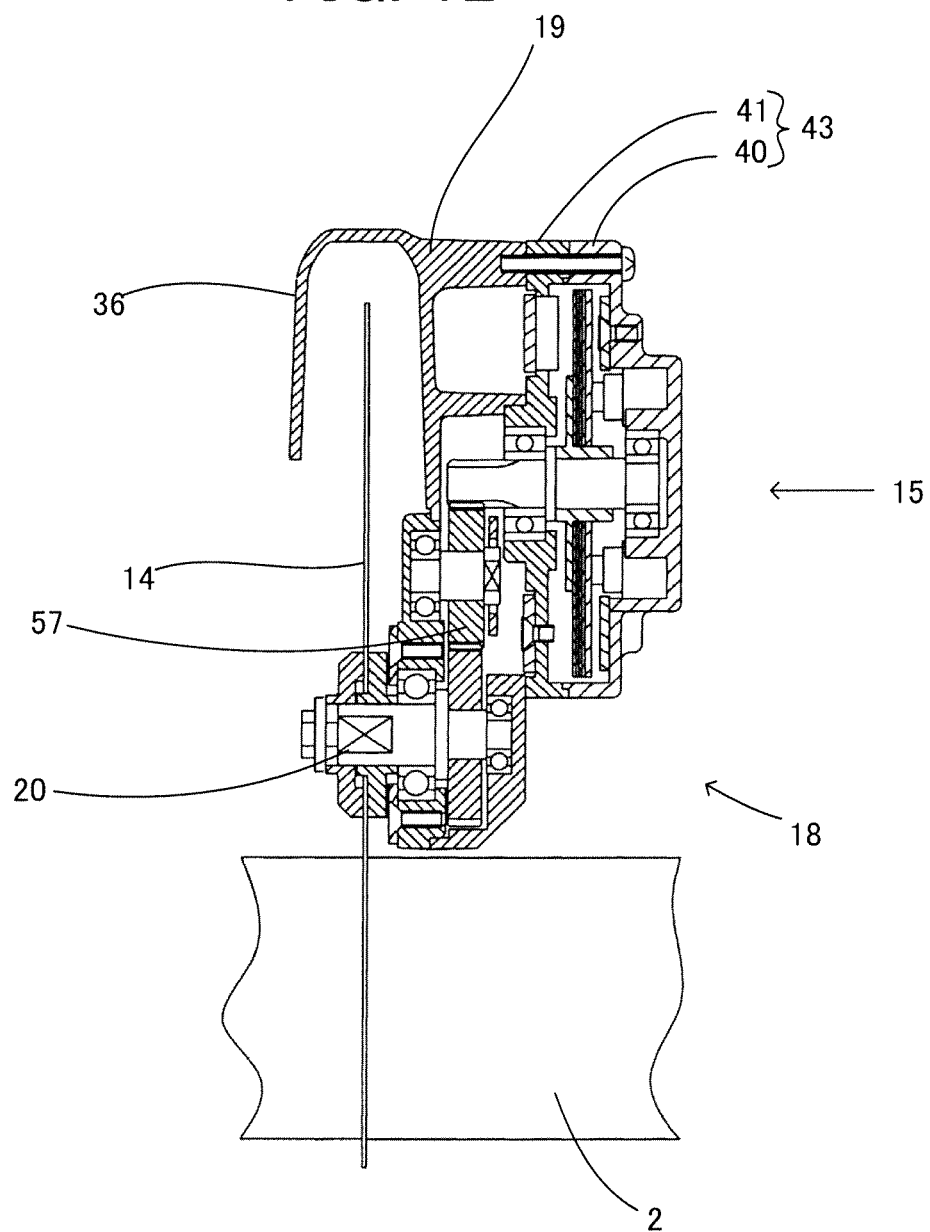
FIG. 12 is a cross-sectional view of the cutting unit in the state shown in FIG. 11.
Figure 13:
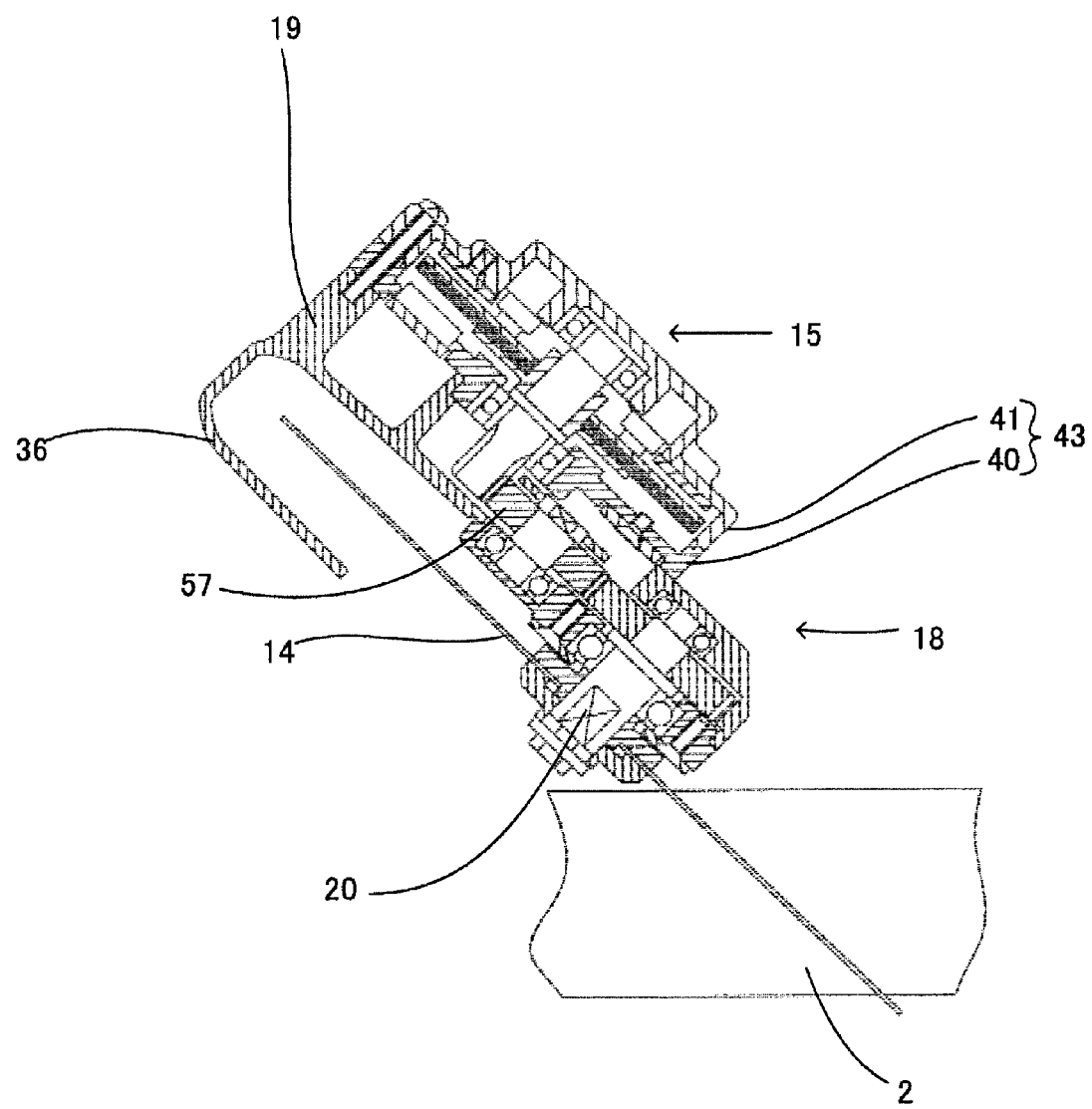
FIG. 13 is a cross-sectional view of the cutting unit of the tabletop circular saw of FIG. 1 in a tilted state.
Figure 14:
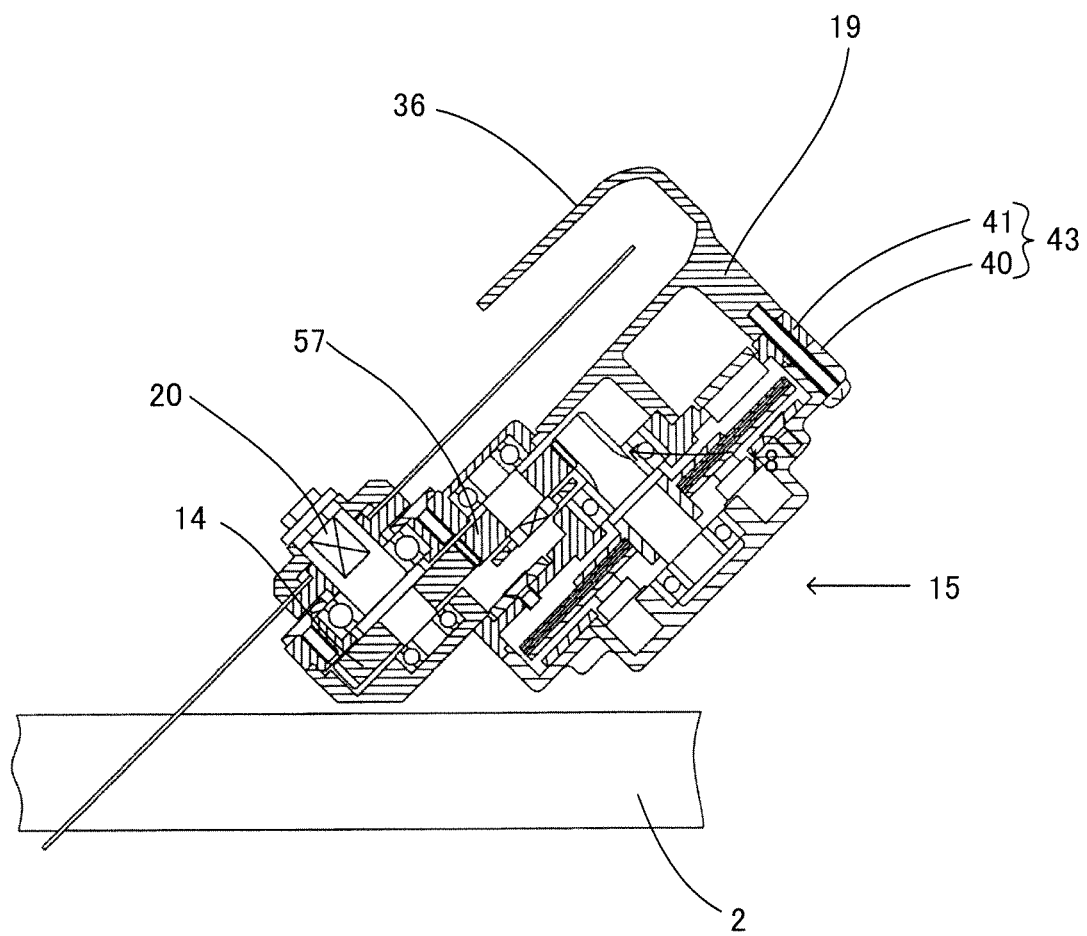
FIG. 14 is a cross-sectional view of the cutting unit of the tabletop circular saw of FIG. 1, in a state tilted to the opposite side as in FIG. 13.

Furthermore, when the target material 2 is cut, the worker adjusts the turntable 5 to the desired position and performs the cutting work by pressing the cutting unit 19 by means of the handle 32, as shown in FIGS. 11 and 12. In addition, when accomplishing inclined cutting on the target material 2, the worker accomplishes the cutting work by pressing the cutting unit 19 down by means of the handle 32 with the device in a state in which the drive unit 7 is tilted around the tilt shaft 6, as shown in FIGS. 13 and 14. In this case, by using a flat motor 15 in which coils are formed inside the disc of the coil disc 49, it is possible to greatly reduce the dimensions of the flat motor 15 in the direction of the axis 50 of the output shaft 44 compared to motors in which coils are wound around the so-called core. Accordingly, it becomes possible to broadly secure a field of vision for the worker during cutting work. In addition, the flat motor 15 having the above-described composition has coils formed by printed circuit boards inside the disc, so the weight of the coil disc 49 is reduced in comparison to motors having coils wound around the so-called core. For this reason, startup when the trigger switch 34 is turned on becomes quicker. In addition, the dimensions of the cutting unit 19 in the direction of the axis 50 are greatly reduced because of the flat motor 15. Consequently, even when the cutting unit 19 is tilted to the side on which the flat motor 15 is installed, it is possible to keep the flat motor 15 and the power transfer unit 18 and the like from making contact with the target material 2. Accordingly, it becomes possible to enlarge the tilt angle of the cutting unit 19, it becomes possible to have the clamp 138 positioned on the flat motor 15 side approach the circular saw blade 14 side, and it becomes possible to have the clamps 38 and 138 be substantially symmetrical, with the turntable 5 interposed in between. Consequently, it is possible to reduce the gap between the clamps 38 and 138. Accordingly, even with small target material 2 can be anchored by using the clamps 38 and 138, greatly improving workability.

In addition, as shown in FIG. 12, the power transfer unit 18 having the intermediate gear 57 is interposed between the flat motor 15 and the circular saw blade 14. Furthermore, the flat motor 15 and the intermediate gear 57 are positioned so that the outer edge of the intermediate gear 57 and the outer edge of the housing 43 of the flat motor 15 are upward from the circular saw rotation shaft 20. Consequently, it is possible to keep the flat motor 15 from making contact with the target material 2 even when using the flat motor 15, so the flat motor 15 and the intermediate gear 57 have no effect on the cutting depth of the circular saw blade 14.

Furthermore, in order to lock rotation of the intermediate shaft 58, the lock member 112 is provided and a pair of flat surfaces 110 and 110 are provided on the intermediate shaft 58. Consequently, it becomes possible, for example, for the rotation lock of the intermediate shaft 58 to lock rotation of the saw blade rotation shaft 20 easily, so that the saw blade 14 can be easily exchanged. Furthermore, because rotation of the intermediate shaft 58 on which no functions other than rotation transfer are provided can be locked, compared to providing a spindle lock mechanism in the saw blade rotation shaft 20 to which the output shaft 44 of the flat motor 15 and the circular saw blade 14 are attached, there is no need to lengthen the output shaft 44 and the saw blade rotation shaft 20 in the axial direction in order to provide a spindle lock mechanism. Consequently, it becomes possible to control the length of the cutting unit 19 relating to the axial direction of the output shaft 44, and it becomes possible to secure a broad field of vision, in addition to making it possible to enlarge the tilt angle even when tilting the cutting unit 19 to the side on which the flat motor 15 is attached, as shown in FIG. 14. In addition, the lock member 112 moves in a direction orthogonal to the axis direction of the intermediate shaft 55 and thus only a little space is needed in the axis direction of the intermediate shaft 55 in order to secure the movement direction of the lock member 112. Accordingly, it becomes possible to further reduce the length of the cutting unit in the axial direction of the output shaft, and it becomes possible to secure a broader field of vision in addition to making it possible to further enlarge the tilt angle.

Figure 15:
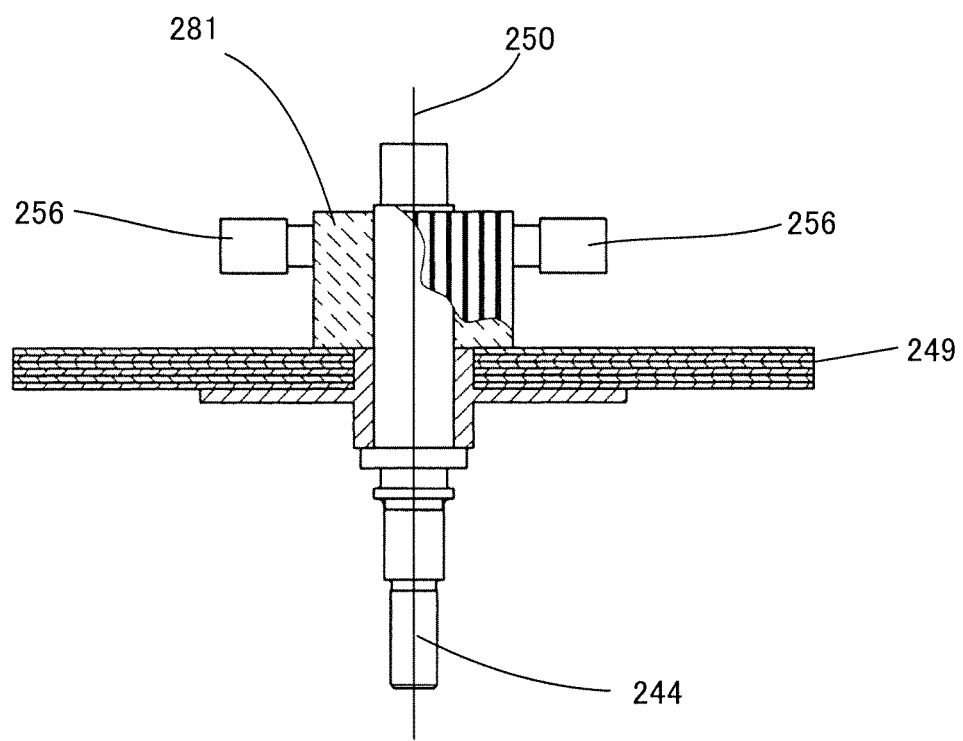
FIG. 15 is a side view of a variation on the rotor of FIG. 1.

With the above-described embodiment, the tabletop circular saw 1 has a tilt unit 7 for tilting the cutting unit 19 about a tilt shaft 6, and a slide unit 9 for causing the cutting unit to slide in the slide shaft 8 direction, but the tilt unit 6 and the slide unit 9 need not necessarily be provided. For example, it would be fine for this to be a tabletop circular saw provided with a tilt unit 7 but with the slide unit 9 not provided, or a tabletop circular saw provided with a slide unit 9 but with the tilt unit 7 not provided, or a tabletop circular saw with neither the tilt unit 7 nor the slide unit 9 provided. In addition, with the above-described embodiment, a commutator 81 is provided composed of a plurality of commutator pieces 82 positioned radially about the axis 50 on the disc surface of the coil commutator disc 62 comprising the coil disc 49, and the brush 56 makes contact in the direction of the axis 50 (orthogonal to the disc surface) with the commutator 81. However, the composition of the commutator and the brush is not limited to this. For example, it would be fine, as shown in FIG. 15, to provide a cylindrical commutator 281 extending along the same axis as the output shaft 244 on the top surface of a coil disc 249 in place of the commutator 81 of the commutator region 80 of the coil commutator disc 62, and for a brush 256 to contact this commutator 281 from a direction orthogonal to the axis 250 of the output shaft 244.

When the commutator 281 and the brush 256 are composed in this manner, the brush 256 contacts the commutator 281 orthogonal to direction of the axis 250 of the output shaft 244. Consequently, it is possible to make surface shaking less likely to occur on the coil disc 249 so that electric current flows with certainty to the coil from the brush 256. In addition, it is easy to thickly form each of the commutator pieces of the commutator 281, making it possible to improve the durability of the commutator 281 and to lengthen the lifespan of the tabletop circular saw 1.

In addition, with the above-described embodiment, in all cases a flat motor 15 is used in which the coil disc 49 rotates as a partial composition of the rotor and the magnet 52 is composed as a stator anchored to the housing 43, but the tabletop circular saw 1 of the present invention is not limited to this. For example, it would be fine to use a flat brushless motor in which a magnet composes the stator rotating integrally with the output shaft and the coil disc composes the stator anchored to the housing. Furthermore, the coil disc need not be a coil disc composed from a printed circuit board, as it would be fine to use a motor provided with a coil disc composed from a plurality of coils arranged in a disc shape, for example, if it is possible to compose such with a flat and compact shape.

Figure 16:
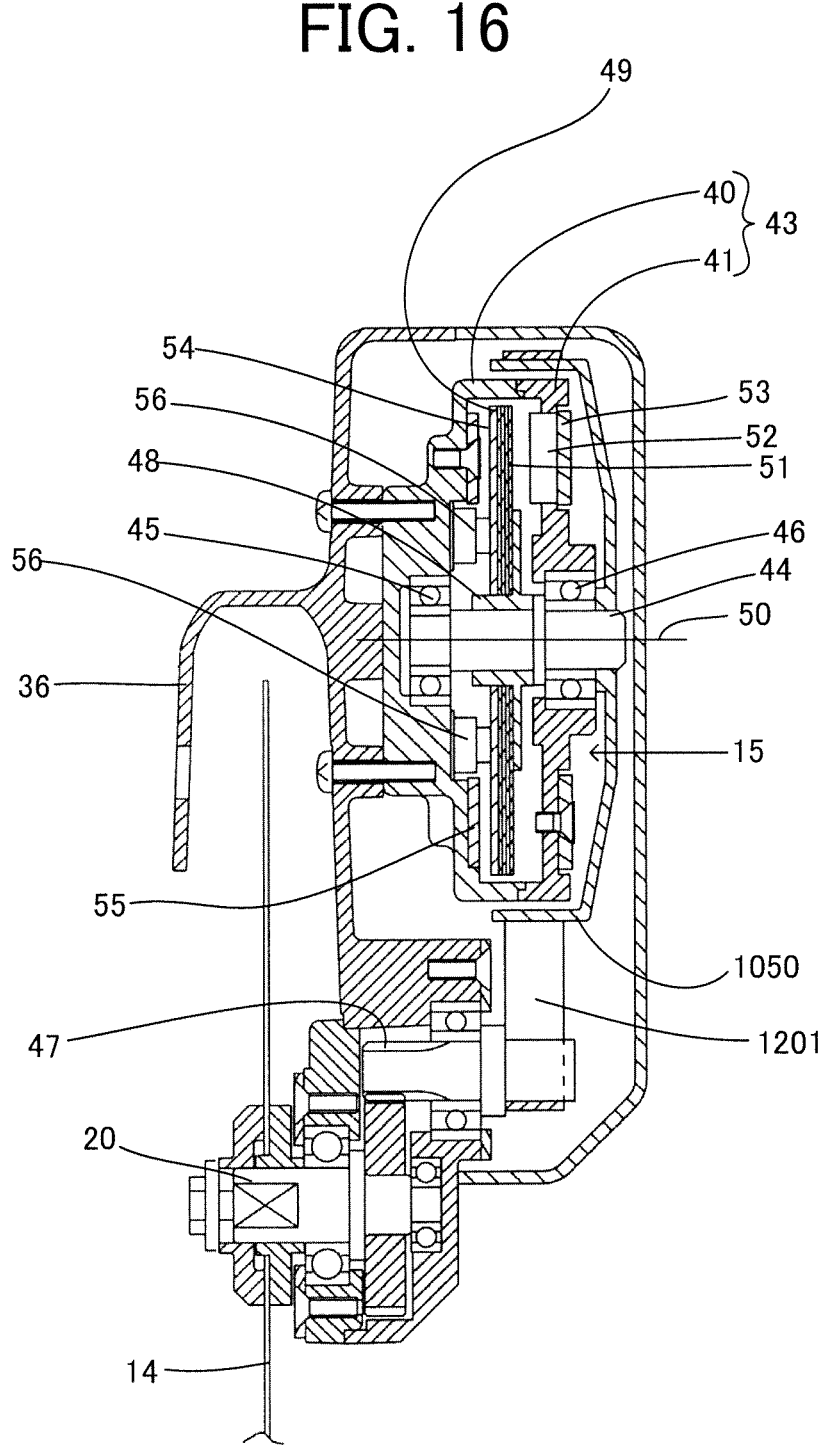
FIG. 16 is a cross-sectional view of a variation on the cutting unit of FIG. 1.

In the above embodiment, the pinion gear 47, the intermediate gear 57 that engages with the pinion gear 47 and the final gear 100 that engages with the intermediate gear 57 and rotates together with the blade rotation shaft 20 are provided. However, as shown in FIG. 16, the structure may comprise a pulley 1050 that can rotate together with the output shaft 44, and a belt 1201 that engages with the pulley 1050 so that the blade rotation shaft 20 is rotated by the rotational force of the motor transmitted via the belt 1201. In the above structure, since the motor 15 is located inside of the pulley 1050, the size of the device in the axial direction can be smaller. This is also an advantage of the above structure.

Having described and illustrated the principles of this application by reference to one preferred embodiments, it should be apparent that the preferred embodiment may be modified in arrangement and detail without departing from the principles disclosed herein and that it is intended that the application be construed as including all such modifications and variations insofar as they come within the spirit and scope of the subject matter disclosed herein.

What is claimed is:

1. A miter saw, comprising:
   a base unit on top of which target material is placed;
   a table unit provided on the base unit so as to be capable of rotating about a first axis;
   a swing unit which is provided on the table unit so as to be capable of rotating about a second axis substantially orthogonal to the first axis, and which swings up and down above the table unit; and a cutting unit provided on the swing unit and having a flat motor provided with a stator and a rotor, the rotor having an output shaft, with one of the rotor and the stator having a coil disc provided with a plurality of coil pieces arranged in the circumferential direction about the output shaft when seen in the axial direction of the output shaft and the other of the rotor and the stator having a magnetic flux generation unit for generating magnetic flux that passes through the coil disc in the axial direction of the output shaft, a rotating blade rotation shaft on which a rotating blade can be mounted and an axial direction of the rotating blade rotation shaft is arranged so as to be substantially parallel to the axial direction of the output shaft of the flat motor and the axial direction of the second axis, and a power transfer unit for transferring the power of the flat motor to the rotating blade rotation shaft, wherein the power transfer unit comprises a first gear provided on the output shaft of the flat motor, a rotating blade gear anchored to the rotating blade rotation shaft, and an intermediate gear engaging with the first gear and the rotating blade gear and anchored to an intermediate shaft rotatably supported on the cutting unit, the flat motor and the intermediate gear are positioned such that in the state in which the swing unit is fully swung in the direction approaching the cutting unit on the table unit, the outer edge of the flat motor and the outer edge of the intermediate gear are farther from the table unit in the axial direction of the first axis than the rotating blade rotation shaft, when seen in the axial direction of the rotating blade rotation shaft, and the cutting unit has an interlocking unit that can interlock directly with the intermediate shaft.

2. The miter saw according to claim 1, wherein a tilt unit is provided between the table unit and the swing unit, said tilt unit being attached to the table unit so as to be capable of rotating about a third axis substantially orthogonal to the first axis and the second axis and supporting the swing unit to enable rotation about the second axis.

3. The miter saw according to claim 2, wherein a slide support unit is provided between the tilt unit and the swing unit, said slide support unit the swing unit on the tilt unit to enable movement substantially parallel to the axial direction of the third axis.

4. The miter saw according to claim 1, wherein:
the flat motor comprises:
the rotor having the coil disc; and
a housing as the stator provided so as to rotatably support the output shaft and cause the magnetic flux generation unit to face the disc surface of the coil disc;
wherein the magnetic flux generation unit is provided with magnets.

5. The miter saw according to claim 1, wherein the intermediate shaft has a pair of substantially parallel flat surfaces extending in the axial direction of the intermediate shaft;
the interlocking unit is engaged with the intermediate shaft on the flat surfaces; and
the cutting unit has a lock member provided so as to be able to move back and forth between a lock position where the interlocking unit interlocks with the flat surfaces, locking rotation of the intermediate shaft, and a lock release position where the interlocking is released and the lock is released.

6. The miter saw according to claim 5, wherein the lock member is provided so as to be able to move back and forth in a direction substantially orthogonal to the axial direction of the intermediate shaft.

7. A miter saw comprising:
a base unit on top of which target material is placed;
a swing unit which is provided on the base unit so as to be capable of rotating up and down about a swing shaft; and
a cutting unit provided on the swing unit and having a flat motor provided with a stator and a rotor, the rotor having an output shaft, with one of the rotor and the stator having a coil disc provided with a plurality of coil pieces arranged in the circumferential direction about the output shaft when seen in the axial direction of the output shaft and the other of the rotor and the stator having a magnetic flux generation unit for generating magnetic flux that passes through the coil disc in the axial direction of the output shaft, a rotating blade rotation shaft on which a rotating blade can be mounted and an axial direction of the rotating blade rotation shaft is arranged so as to be substantially parallel to the axial direction of the output shaft of the flat motor and the axial direction of the swing shaft, and a power transfer unit for transferring the power of the flat motor to the rotating blade rotation shaft, wherein the power transfer unit comprises a first gear provided on the output shaft of the flat motor, a rotating blade gear anchored to the rotating blade rotation shaft, and an intermediate gear engaging with the first gear and the rotating blade gear and anchored to an intermediate shaft rotatably supported on the cutting unit, the base unit has a tilt shaft substantially orthogonal to the swing shaft, the base unit has a table unit which is capable of rotating about a table rotation shaft substantially orthogonal to the swing shaft and the tilt shaft, the flat motor and the intermediate gear are positioned such that in the state in which the swing unit is fully swung in the direction approaching the cutting unit on the table unit, the outer edge of the flat motor and the outer edge of the intermediate gear are farther from the table unit in the axial direction of the table rotation shaft than the rotating blade rotation shaft, when seen in the axial direction of the rotating blade rotation shaft, and the cutting unit has an interlocking unit that can interlock directly with the intermediate shaft.

8. The miter saw according to claim 7, wherein the base unit has a tilt unit that supports the swing unit to enable rotation about the tilt shaft.

9. The miter saw according to claim 8, wherein
the tilt unit is provided on the table unit.

10. The miter saw according to claim 8, wherein a slide support unit is provided between the tilt unit and the swing unit, said slide support unit supporting the swing unit on the tilt unit to enable movement substantially parallel to the axial direction of the tilt shaft.

11. The miter saw according to claim 8, wherein:
the flat motor comprises:
the rotor having the coil disc; and
a housing as the stator provided so as to rotatably support the output shaft and cause the magnetic flux generation unit to face the disc surface of the coil disc;
wherein the magnetic flux generation unit is provided with magnets.

12. The miter saw according to claim 7, wherein the intermediate shaft has a pair of substantially parallel flat surfaces extending in the axial direction of the intermediate shaft;
the interlocking unit is engaged with the intermediate shaft on the flat surfaces; and
the cutting unit has a lock member provided so as to be able to move back and forth between a lock position where the interlocking unit interlocks with the flat surfaces, locking rotation of the intermediate shaft, and a lock release position where the interlocking is released and the lock is released.

13. The miter saw according to claim 12, wherein the lock member is provided so as to be able to move back and forth in a direction substantially orthogonal to the axial direction of the intermediate shaft.

* * * * *